(12) United States Patent
Takada et al.

(10) Patent No.: US 6,619,038 B2
(45) Date of Patent: Sep. 16, 2003

(54) AXLE DRIVING APPARATUS

(75) Inventors: Kenichi Takada, Hyogo-ken (JP); Ryota Ohashi, Hyogo-ken (JP)

(73) Assignee: Kanzaki Kokyukoki Mfg. Co., Ltd. (JP)

(*) Notice: Subject to any disclaimer, the term of this patent is extended or adjusted under 35 U.S.C. 154(b) by 0 days.

(21) Appl. No.: 09/862,450

(22) Filed: May 23, 2001

(65) Prior Publication Data

US 2002/0002825 A1 Jan. 10, 2002

(30) Foreign Application Priority Data

Jul. 4, 2000 (JP) .................................... 2000-202627

(51) Int. Cl.[7] .............................................. F16D 31/02
(52) U.S. Cl. .......................................... 60/444; 60/487
(58) Field of Search ........................... 60/443, 444, 487

(56) References Cited

U.S. PATENT DOCUMENTS

| | | | | |
|---|---|---|---|---|
| 2,788,636 A | * | 4/1957 | Badalini ..................... | 60/492 |
| 3,132,486 A | * | 5/1964 | Jonkers et al. ............. | 60/489 |
| 3,499,285 A | * | 3/1970 | Nicholls ..................... | 60/444 |
| 3,540,220 A | | 11/1970 | Lauck | |
| 4,720,974 A | * | 1/1988 | Cockeram ................... | 60/443 |
| 4,756,157 A | | 7/1988 | Appel | |
| 4,977,760 A | * | 12/1990 | Ishimori et al. ............ | 60/444 |
| 5,875,631 A | | 3/1999 | Smith | |

FOREIGN PATENT DOCUMENTS

| | | | |
|---|---|---|---|
| JP | 59 220419 A | 12/1984 | |
| JP | 62 137223 A | 6/1987 | |

* cited by examiner

*Primary Examiner*—F. Daniel Lopez
(74) *Attorney, Agent, or Firm*—Sterne, Kessler, Goldstein & Fox P.L.L.C.

(57) ABSTRACT

An axle driving apparatus comprising a common housing in which a hydraulic pump and a hydraulic motor fluidly connected with each other and an axle driven by the hydraulic motor are disposed. At least one of the hydraulic pump and the hydraulic motor is variable in displacement and has a capacity changing device for changing its capacity. A hydraulic actuator is provided in the housing for controlling the capacity changing device. A control valve for hydraulically controlling the hydraulic actuator is provided in the housing. A center section for fluidly connecting the hydraulic pump and the hydraulic motor with each other is fixedly disposed in the housing and a driving part of the hydraulic actuator and the control valve are incorporated in the center section. A rotary member operatively connected to a human-operated traveling control member provided on a vehicle is rotatably supported by the housing. A link member is interposed between the rotary member and the control valve so as to alter the rotational movement of the rotary member to the reciprocal movement of the control valve. The driving part of the hydraulic actuator is connected to the link member for its feedback.

21 Claims, 7 Drawing Sheets

AXLE DRIVING APPARATUS

BACKGROUND OF THE INVENTION

1. Field of the Invention

The present invention relates to an axle driving apparatus, whose output speed is changed by manipulation of a traveling control member, wherein the human operational force to be applied onto the traveling control member can be reduced.

2. Background Art

Conventionally, there is a well-known axle driving apparatus having a construction such that a hydraulic pump driven by an engine, a hydraulic motor fluidly connected with the hydraulic pump and an axle driven by output rotation of the hydraulic motor are incorporated in a common housing. Hereinafter, such an axle driving apparatus is referred to as an integrated hydrostatic transmission, namely, an "IHT". Also, hereinafter, a hydrostatic transmission constituted by the hydraulic pump and the hydraulic motor fluidly connected with each other is referred to as an "HST".

At least either the hydraulic pump or the hydraulic motor is of a variable displacement type provided with a capacity changing device like a movable swash plate in connection with a human-operated traveling control member. The capacity thereof is continuously varied according to the operational degree of the traveling control member so as to continuously change the rotational speed of the axle.

The IHT is lightened and compacted because the hydraulic pump, the hydraulic motor and the axle are incorporated together in the common housing, thereby being advantageous in compacting a vehicle equipped with the IHT. However, if the vehicle travels with the axles under a heavy load, an operator is troubled to apply a great force onto the traveling control member for the speed changing operation, thereby hindering a smooth speed changing.

BRIEF SUMMARY OF THE INVENTION

An object of the present invention is to provide an IHT which can be smoothly operated in its speed changing by reduced human force.

To attain the object, a hydraulic actuator such as a hydraulic cylinder is provided for controlling the capacity changing device. The hydraulic actuator comprises a driving part and a fixed part. The driving part is operatively connected to the capacity changing device. If the capacity changing device is a rotationally movable swash plate, a connection member is interposed between the driving part of the hydraulic actuator and the movable swash plate so as to alter the reciprocal movement of the driving part to the rotational movement of the movable swash plate.

The fixed part of the hydraulic actuator is fixed to the housing. Moreover, if a center section is fixed to the housing for fluidly connecting the hydraulic pump and the hydraulic motor with each other, the center section may serve as the fixed part of the hydraulic actuator, thereby reducing the number of parts required to produce the hydraulic actuator. Also, in this case, the driving part is incorporated in the center section, thereby contributing for minimization of the IHT. Furthermore, the control valve may be also incorporated in the center section so as to further minimize the IHT. In this case, the control valve may be reciprocally movable in parallel to the driving part of the hydraulic actuator, thereby extremely reducing the waste portion of the center section for arrangement of the hydraulic actuator and the control valve.

The hydraulic actuator is hydraulically controlled by a control valve. For operating the control valve, a link mechanism operatively connected to a human-operated traveling control member provided on a vehicle is supported by the housing so as to be connected to the control valve. All the human operational force to be applied onto the traveling control member may be just as much as that required to move the control valve through the link mechanism. Thus, the human operational force for speed change can be reduced so as to enable the vehicle to be tirelessly driven even for a long time.

Preferably, for minimizing the hydraulic servomechanism comprising the hydraulic actuator, the control valve and the link mechanism, the control valve is reciprocally movable in parallel to the driving part of the hydraulic actuator. The link mechanism comprises a rotary member rotatably supported by the housing and a link member interposed between the rotary member and the control valve. The rotary member is operatively connected to the traveling control member. The link member alters the rotational movement of the rotary member into the reciprocal movement of the control valve.

The driving part of the hydraulic actuator may be connected to the link member for its feedback. For preventing the human force required to operate the control valve from increasing, a portion of the link member between its connection points with the rotary member and the control valve is provided for connection with the driving part of the hydraulic actuator.

The link mechanism, or especially, the rotary member can be provided as an effective portion to which a neutral returning means for returning the capacity changing device to its neutral position is attached. That is, by biasing the link mechanism or the rotary member to its neutral position, the neutral position of the capacity changing device can be defined.

For supplying oil into the hydraulic actuator through the control valve, the oil filled in the housing may be used. Moreover, when a charge pump for supplying the HST with oil is provided in the housing, the charge pump may also be used for supplying the hydraulic actuator with oil. Oil from the hydraulic actuator may be drained into the inner space of the housing. Therefore, any other oil source is not required for the hydraulic actuator, thereby saving the number of parts for constituting the hydraulic servomechanism for moving the capacity changing device so as to save costs.

The hydraulic actuator and the control valve may be contained in the common housing. Moreover, the link mechanism may be also contained in the housing except for a portion thereof in connection with the human-operated member provided outside the housing. Thus, the oil circuit for supplying the hydraulic cylinder and the control valve with oil from the oil sump in the housing can be extremely minimized so as to enable the IHT with such a hydraulic servomechanism to be excellently compact. Also, such component parts of the hydraulic servomechanism for moving the capacity changing device are protected by the housing from muddy water, rain water, dust and other impurities so as to improve the durability and reliability of the IHT in its capacity control.

The above, further and other objects, features and advantages will appear from the following description.

BRIEF DESCRIPTION OF THE DRAWINGS/FIGURES

Figure 2:
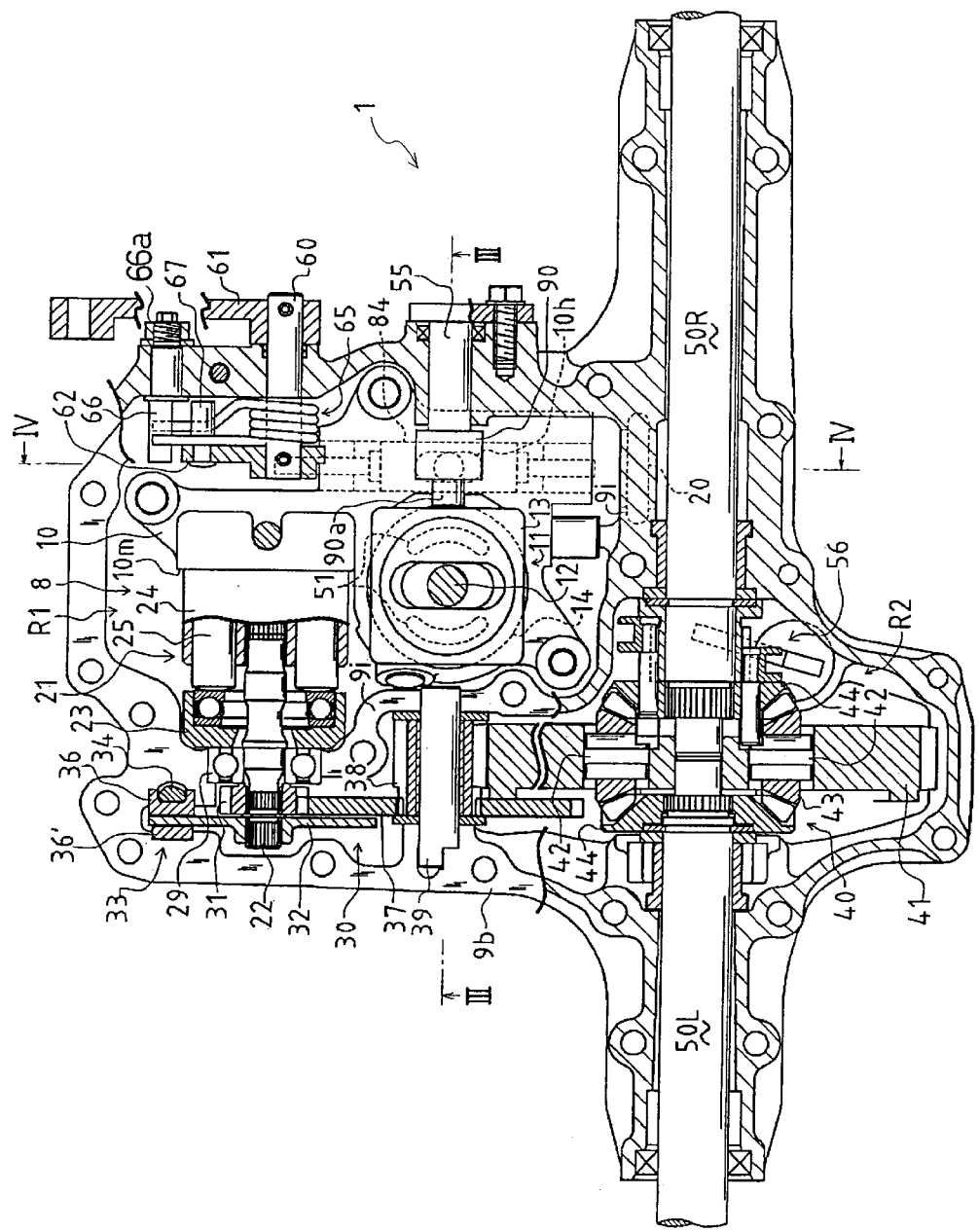
FIG. 2 is a sectional plan view of the same IHT.
Figure 6:
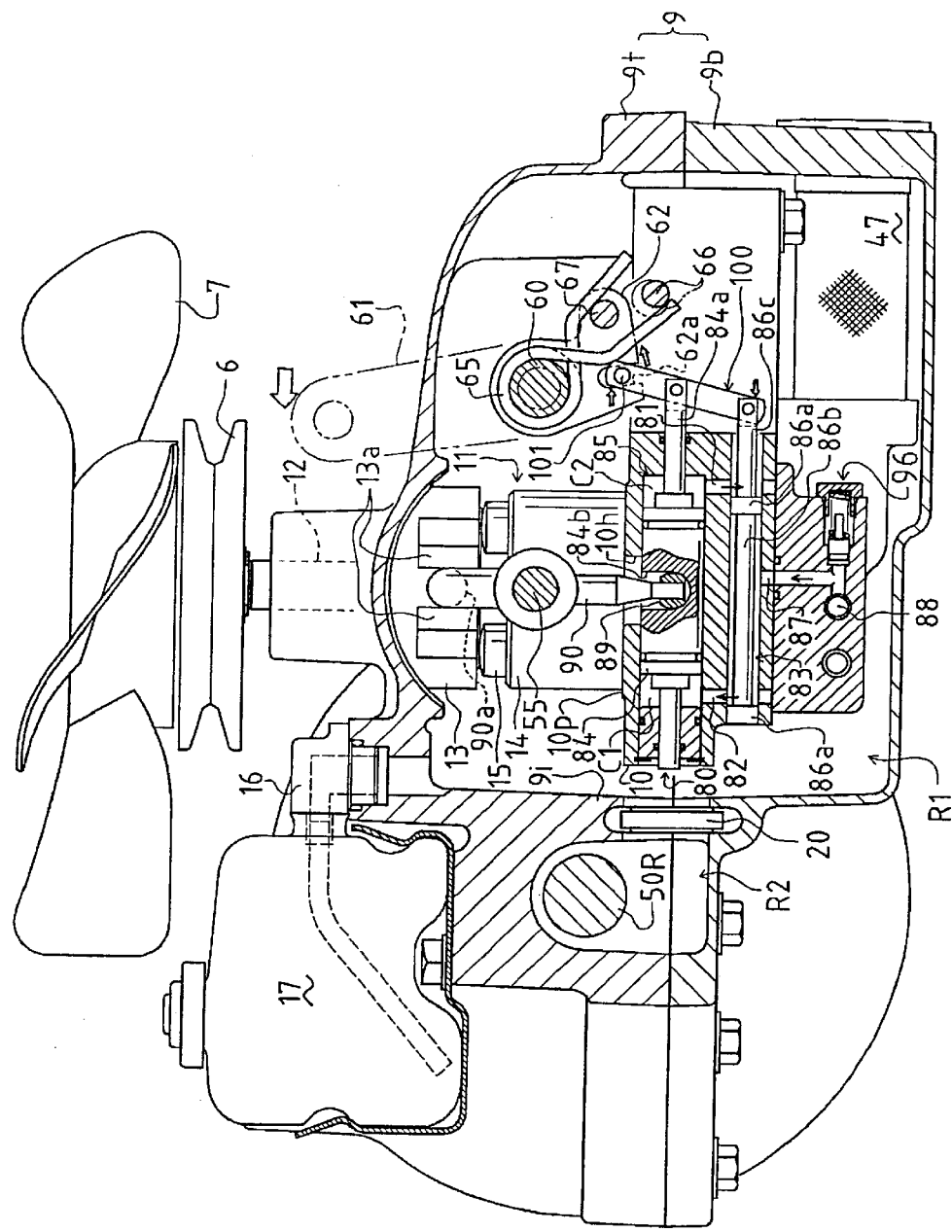
Figure 7:
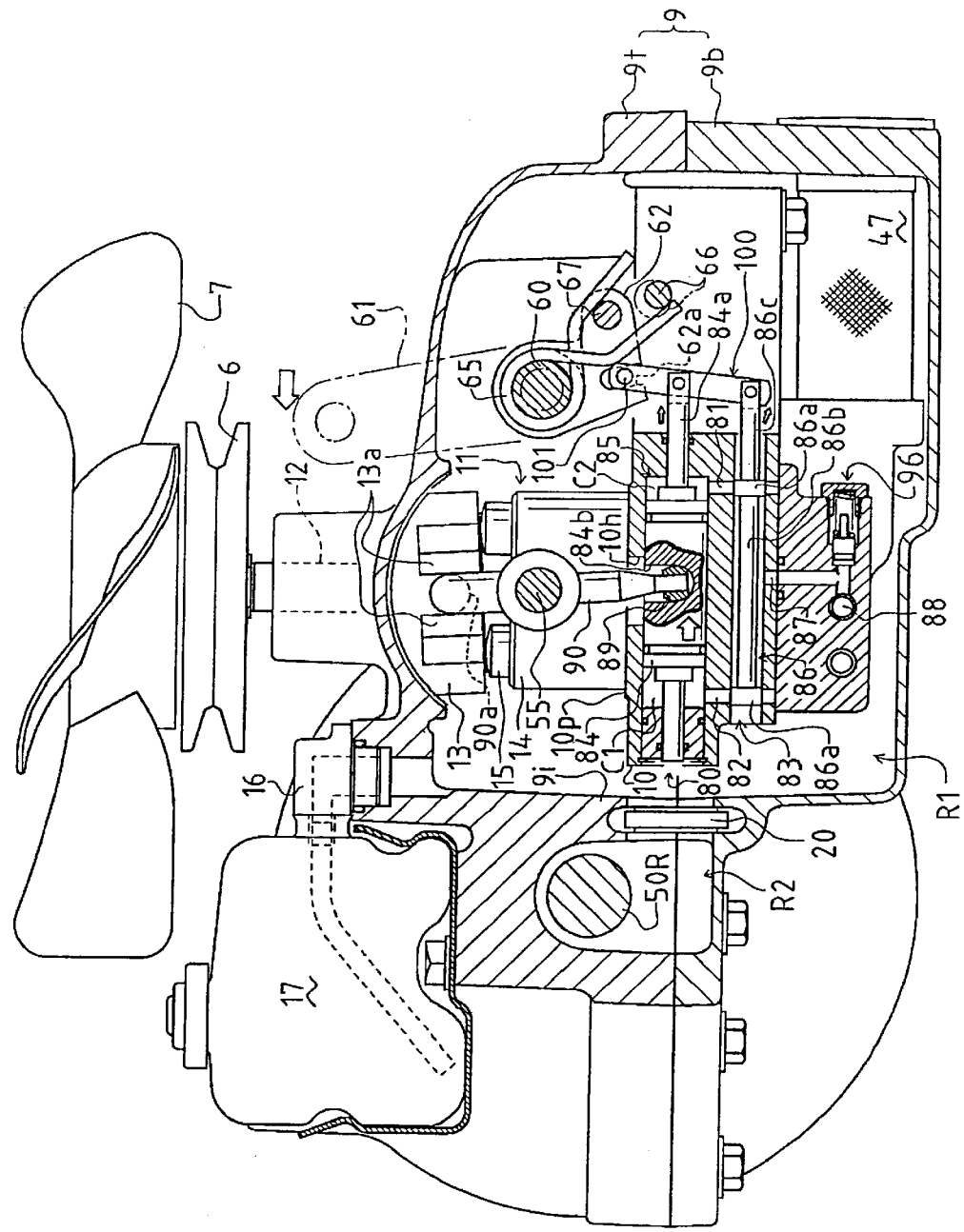

FIG. 6 is a cross sectional view taken on line III—III of FIG. 2, wherein control lever 61 starts its rotation; and FIG. 7 is a cross sectional view taken on line III—III of FIG. 2, wherein a movable swash plate 13 is rotated according to the rotation of control lever 61.

DETAILED DESCRIPTION OF THE INVENTION

Figure 3:
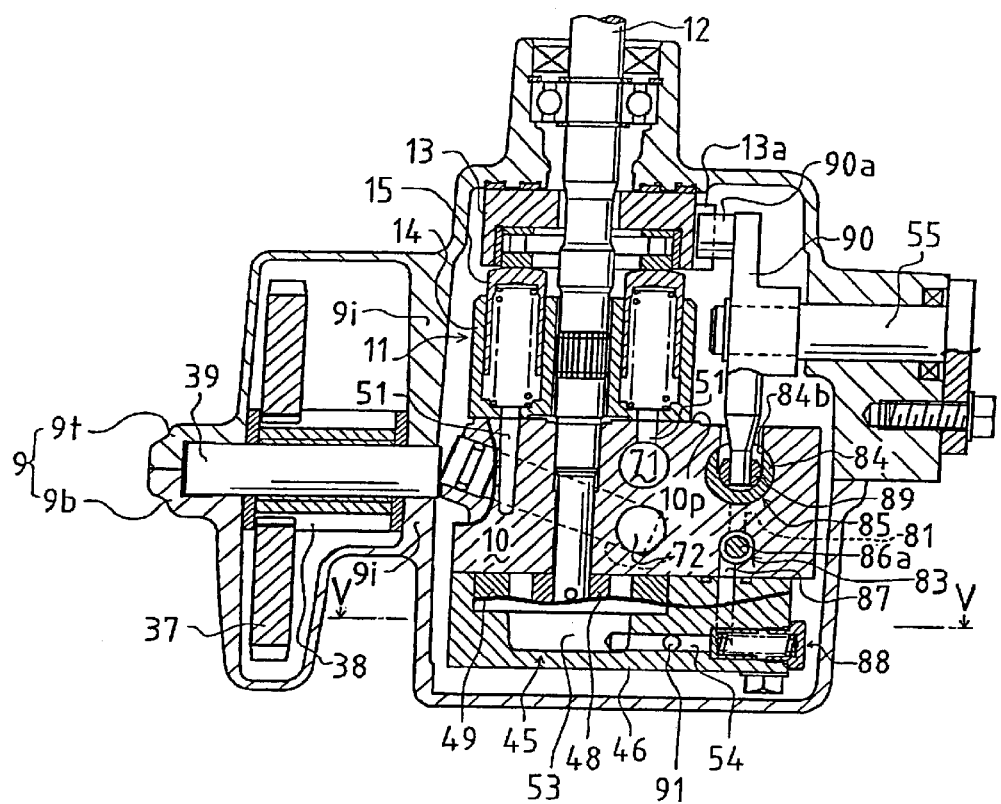
FIG. 3 is a cross sectional view taken on line III—III of FIG. 2, wherein a control lever 61 is at its initial position.
Figure 4:
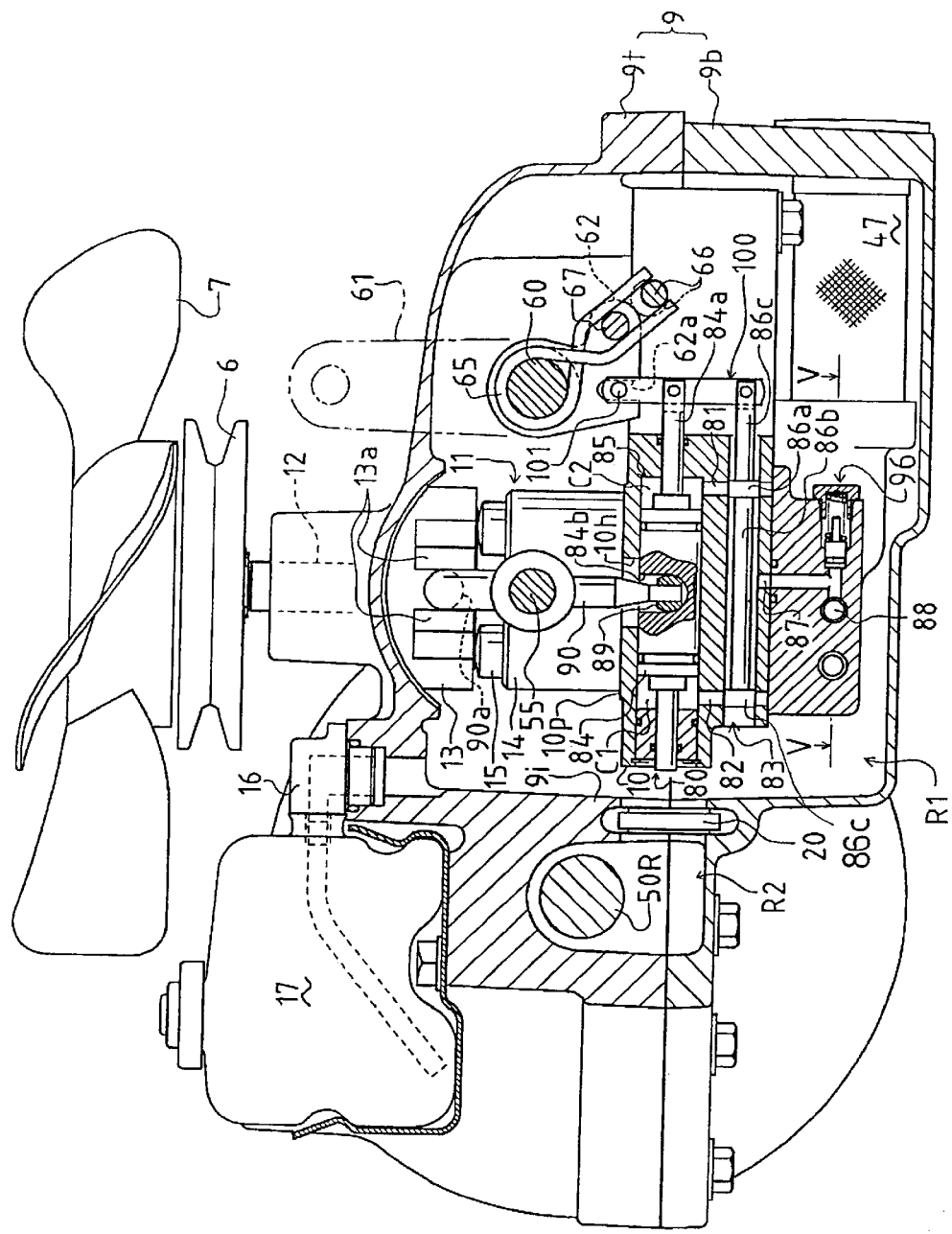
FIG. 4 is a cross sectional view taken on line IV—IV of FIG. 2.

A general structure of an IHT 1 serving as an axle driving apparatus of the present invention will be described. As shown in FIGS. 3 and 4, an upper housing part 9t and a lower housing part 9b are joined with each other through their surrounding horizontal joint surfaces so as to constitute a housing 9. A later-discussed motor shaft 22 is rotatably disposed between upper and lower housing parts 9t and 9b so that its axis is on the horizontal joint surfaces of joined upper and lower housing parts 9t and 9b. Left and right axles 50L and 50R are disposed above the joint surfaces between joined upper and lower housing parts 9t an 9b and rotatably supported by upper housing part 9t. Axles 50L and 50R are differentially connected with each other through a differential gear unit 40 in housing 9 and project laterally outwardly from housing 9 in opposite directions.

An interior space of housing 9 is divided into first chamber R1 and second chamber R2 by a partition wall 9i integrally formed of housing 9. In first chamber R1 are disposed a hydraulic pump 11 and a hydraulic motor 21, which are hydraulically connected with each other so as to constitute an HST 8. In second chamber R2 are disposed above-mentioned axles 50L and 50R, differential gear unit 40, and a drive train 30 for transmitting power from a later-discussed motor shaft 22 of HST 8 to differential gear unit 40.

In this manner, hydraulic pump 11, hydraulic motor 21 and differential gear unit 40 are contained in common housing 9, thereby constituting IHT 1 as an excellently compact axle driving apparatus.

As shown in FIGS. 3 and 4, an upper half of partition wall 9i is formed downwardly in upper housing part 9t from the ceiling thereof to the bottom surface as the above-mentioned horizontal joint surface thereof. A lower half of partition wall 9i is formed upwardly in lower housing part 9b from the bottom thereof to the top surface as the above-mentioned horizontal joint surface thereof. By joining upper housing part 9t and lower housing part 9b with each other, upper and lower halves of partition wall 9i are joined with each other, thereby constituting partition wall 9i.

First chamber R1 and second chamber R2 are filled therein with common oil, thereby serving as respective oil sumps. As shown in FIG. 4, an external reservoir tank 17 is mounted on upper housing part 9t so as to fluidly communicate with first chamber R1 through a joint port 16. Even if the hydraulic oil in first chamber R1 is heated by operation of HST 8 so as to be expanded, the increased volume of the hydraulic oil flows into reservoir tank 17, thereby regulating the volume of hydraulic oil in first chamber R1.

Also, oil is allowed to flow between first and second chambers R1 and R2 through an oil filter 20 provided in an optimal portion of partition wall 9i, thereby regulating the volume of hydraulic oil in first chamber R1. Oil in second chamber R2 is contaminated by iron powder generated from rubbing gears therein or the like, however, such impurities are removed by oil filter 20 before the oil in second chamber R2 enters first chamber R1, thereby protecting HST 8 in first chamber R1. Thus, the common oil filled in housing 9 functions as lubrication oil for gears, bearings and the like, as well as hydraulic oil for HST 8.

In first chamber 9, a center section 10 of HST 8 is removably attached to housing 9. As shown in FIG. 2, when viewed in plan, a longitudinal direction of center section 10 is oriented perpendicularly to axles 50L and 50R. A front half portion of center section 10 arranged in this manner has a vertical surface serving as a motor mounting surface 10m, onto which hydraulic motor 21 is mounted. A rear portion of such center section 10 has a horizontal surface serving as a pump mounting surface 10p, onto which hydraulic pump 11 is mounted (see FIGS. 3 and 4).

Center section 10 is formed therein with a pair of oil circulation passages 71 and 72 for circulating oil between hydraulic pump 11 and hydraulic motor 21.

With respect to hydraulic pump 11, as shown in FIGS. 2, 3 and 4, a cylinder block 14 is slidably rotatably attached to pump mounting surface 10p of center section 10 through a valve plate. Cylinder block 14 is formed therein with a plurality of cylinder holes, into which respective pistons 15 are reciprocally inserted through respective biasing springs. A movable swash plate 13 serving as a capacity changing device for HST 8 abuts against heads of pistons 15.

A pair of kidney ports 51 in communication with respective oil circulation passages 71 and 72 are open at pump mounting surface 10p. Thus, hydraulic pump 11 (the cylinder holes in cylinder block 14) is brought into fluidal communication with the pair of oil circulation passages 71 and 72 through kidney ports 51.

Figure 1:
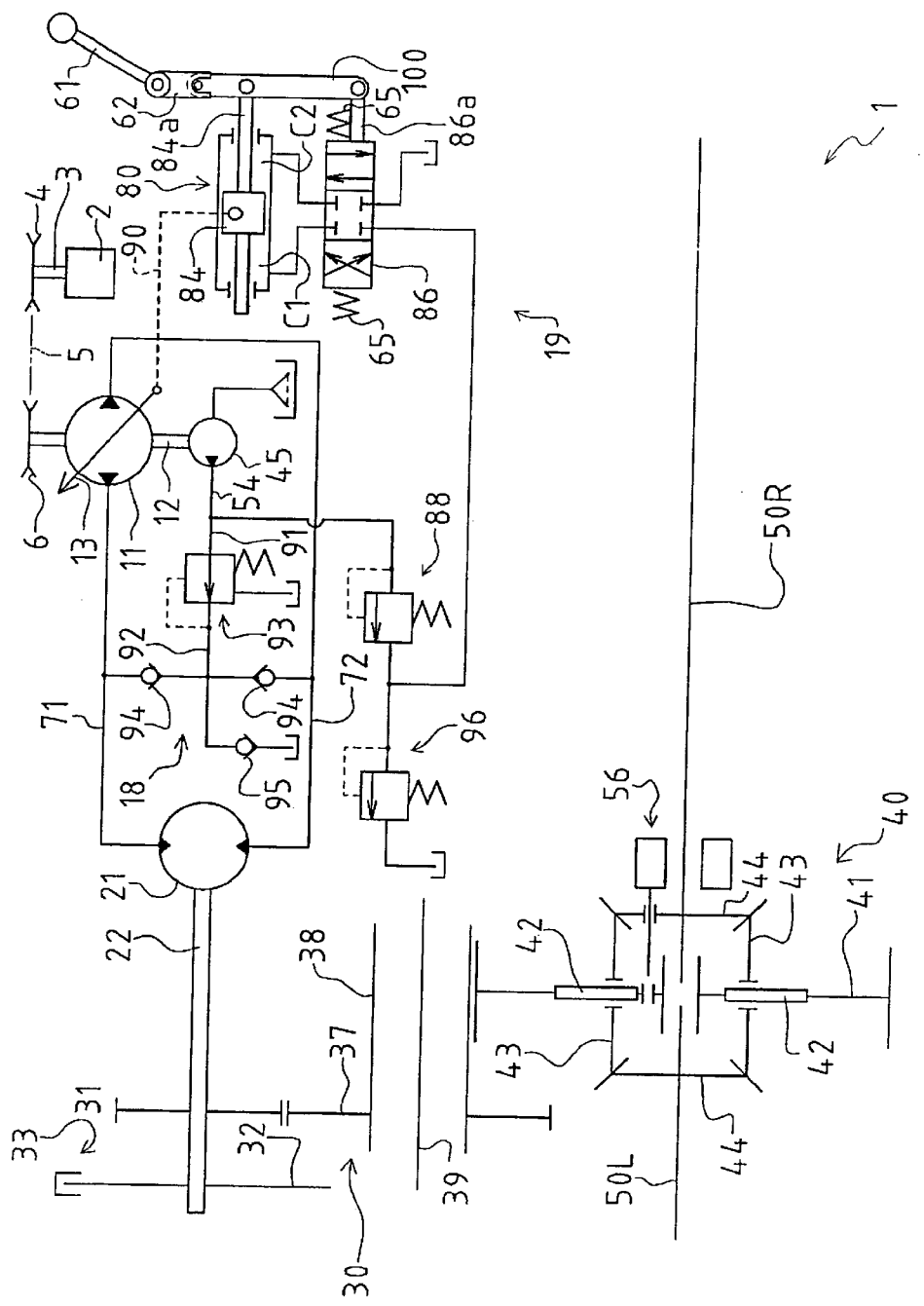
FIG. 1 illustrates a diagram and a hydraulic circuit of an IHT according to an embodiment of the present invention.

Cylinder block 14 is fixedly engagingly provided on its rotational axis with a pump shaft 12. Pump shaft 12 projects upwardly from upper housing part 9t so as to be fixedly provided thereon with a cooling fan 7 and an input pulley 6. As shown in FIG. 1, input pulley 6 is drivingly connected through a belt 5 with an output pulley 4 fixed on an output shaft 3 of a vehicle engine 2, thereby serving as an input pulley of IHT 1.

Movable swash plate 13 is rotatably tilted so that its surface abutting against pistons 15 is slanted at an optional angle from its horizontal condition where it is perpendicular to pistons 15, i.e., the rotational axis of cylinder block 14, thereby changing the amount and direction of oil discharged from hydraulic pump 11. A hydraulic actuator for operating movable swash plate 13 is provided as discussed later.

Pressure oil discharged from hydraulic pump 11 is sent to hydraulic motor 21 through either oil circulation passage 71 or 72, and returned through the other of oil circulation passages 71 and 72, thereby being circulated between hydraulic pump 11, and hydraulic motor 21.

With respect to hydraulic motor 21, as shown in FIG. 2, a cylinder block 24 is slidably rotatably attached to motor mounting surface 10m through a valve plate so as to orient its rotational axis laterally horizontally. A plurality of pistons 25 are reciprocally inserted through respective biasing springs into respective cylinder holes bored in cylinder block 24.

A fixed swash plate 23 is fixedly sandwiched between upper and lower housing parts 9t and 9b so as to abut against heads of pistons 25. Cylinder block 24 is fixedly engagingly provided on its rotational axis with motor shaft 22. Such motor shaft 22 is laterally horizontally disposed in parallel to axles 50L and 50R.

One end of motor shaft 22 is rotatably supported in a bearing hole which is open at the center of motor mounting surface 10m of center section 10. The other end of motor shaft 22 is inserted into second chamber R2 while the intermediate portion of motor shaft 22 being rotatably supported by a bearing 29 provided between the upper and lower halves of partition wall 9i. Bearing 29 is provided with a seal for preventing oil from flowing between first and second chambers R1 and R2 therethrough.

Drive train 30 which transmits power from motor shaft 22 to differential gear unit 40 will be described. As shown in FIG. 2, an output gear 31 and brake disk 32 are fixed onto motor shaft 22 in second chamber R2. A braking device 33 is disposed adjacent to brake disk 32 so as to apply a braking force onto brake disk 32, thereby braking motor shaft 22.

As shown in FIG. 2, braking device 33 comprises a pair of brake pads 36 and 36', a brake control shaft 34 and a brake lever fixed onto brake control shaft 34. Brake pads 36 are disposed adjacent to brake disk 32 so as to be opposite to each other with respect to brake disk 32. Brake control shaft 34 is notched so as to be substantially D-shaped in section, thereby serving as a cam for brake pad 36 against brake disk 32. Brake control shaft 34 is vertically disposed, rotatably supported by the top wall of upper housing part 9t, and projects upwardly therefrom so as to be fixedly provided thereon with the brake lever (not shown).

By rotating the brake lever, brake control shaft 34 is integrally rotated so that its cam portion presses brake pad 36 against brake disk 32. Whereby brake disk 32 is sandwiched between brake pads 36 and 36' under pressure so as to brake motor shaft 22 frictionally.

In second chamber R2, a horizontal counter shaft 39 is disposed in parallel behind motor shaft 22. A diametrically small gear 38 is freely provided around counter shaft 39. A diametrically large gear 37 is not-relatively-rotatably fit on diametrically small gear 38 so as to engage with output gear 31 fixed on motor shaft 22. Diametrically small gear 38 constantly engages with a later-discussed input gear 41 of differential gear unit 40. Due to such an arrangement, power is transmitted from output gear 31 to input gear 41 through speed reduction gears 38 and 37.

Differential gear unit 40 will be described. As shown in FIG. 2, in input gear 41, a pair of laterally-through holes are provided so as to be opposite to each other with respect to a rotational axis of input gear 41, or axles 50L and 50R. A pair of pinion shafts 42 which are perpendicular to axles 50L and 50R are disposed in the respective holes so as to be rotatable integrally with input gear 41 around axles 50L and 50R. Bevel pinions 43 are provided on respective pinion shafts 42 so as to be rotatable relatively to input gear 41. A pair of bevel side gears 44 are fixed onto proximal end portions of axles 50L and 50R respectively. Accordingly, power received by input gear 41 is transmitted to left and right axles 50L and 50R through bevel pinions 43 and bevel side gears 44.

In this manner, differential gear unit 40 comprises no differential casing because pinions 43 are incorporated in input gear 41, thereby being further compact.

Incidentally, for differential-locking, i.e., for locking left and right axles 50L and 50R with each other, one of bevel side gears 44 (in this embodiment, right bevel side gear 44) can be locked with input gear 41 by a differential lock mechanism 56 disposed around one of axles 50L and 50R (in this embodiment, right axle 50R).

An oil-charge system for compensating an oil leak in HST 8 will be described. As shown in FIG. 3, a charge pump casing 46 is attached onto the bottom surface of center section 10 in housing 9. In charge pump casing 46 adjacent to the bottom surface of center section 10 are rotatably disposed an inner rotor 48 and an outer rotor 49 engaging with each other, thereby constituting a charge pump 45. Pump shaft 12 is extended downwardly from center section 10 so as to be fixed to inner rotor 48. Therefore, by rotation of pump shaft 12 receiving power from engine 2, hydraulic pump 11 and charge pump 45 are synchronously driven.

Figure 5:
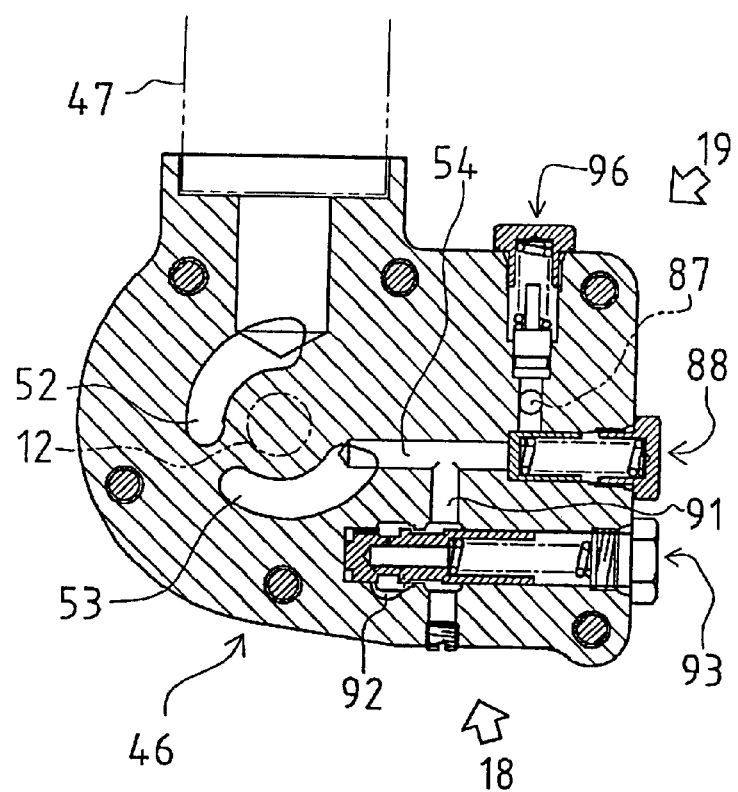
FIG. 5 is a cross sectional view taken on line V—V of FIGS. 3 and 4.

As shown in FIGS. 3 and 5, an oil suction port 52 and an oil discharge port 53 are formed in charge pump casing 46 just under rotors 48 and 49. As shown in FIGS. 4 and 5, a filter 47 is supported between a side surface of charge pump casing 46 and a side wall of housing 9 (lower housing part 9b). By driving charge pump 45, i.e., rotating rotors 48 and 49, oil in first chamber R1 is absorbed into oil suction port 52 through filter 47 and discharged from oil discharge port 53 through rotors 48 and 49. As shown in FIGS. 1 and 5, an oil passage 54 extended from oil discharge port 53 is formed in charge pump casing 46 so as to distribute oil therethrough between a charge oil circuit 18 formed in center section 10 and a hydraulic oil circuit 19 for a later-discussed swash plate control mechanism.

As shown in FIGS. 3 and 5, charge oil circuit 18 for HST 8 comprises a first charge oil passage 91, a reducing valve 93, a second charge oil passage 92 and a pair of check valves 94 (see FIG. 1). First charge oil passage 91 in connection with oil passage 54 formed in charge pump casing 46 is connected to second charge oil passage 92 through a reducing valve 93. Therefore, oil discharged from charge pump 45 is introduced into reducing valve 93 through first charge oil passage 91 so as to be decompressed to the predetermined charge pressure by reducing valve 93, and then flows into second charge oil passage 92. Each check valve 94 is opened when the hydraulic pressure of either corresponding oil circulation passage 71 or 72 is less than that of second charge oil passage 92, so as to allow oil to flow only in the direction from second charge oil passage 92 to either corresponding oil circulation passage 71 or 72, thereby compensating the oil loss in oil circulation passages 71 and 72.

Charge oil circuit 18 further comprises a check valve 95 for preventing drive wheels of a vehicle from being unexpectedly freely rotated. Check valve 95 allows oil to flow from the oil sump in first chamber R1 to check valves 94. If engine 2 is stopped while a vehicle is on a slope, axles 50L and 50R tend to rotate so that hydraulic motor 21 functions as a pump so as to reduce the hydraulic pressure of either oil circulation passage 71 or 72. For holding axles 50L and 50R in stationary, this reduced hydraulic pressure is required to be compensated. However, charge pump 45 is not driven because engine 2 is not driven. Therefore, check valve 95 and corresponding one of check valves 94 are opened by the depression of hydraulically reduced oil circulation passage 71 or 72 so as to introduce the oil in first chamber R1 thereinto.

A hydraulic servomechanism for controlling movable swash plate 13 will be described. As shown in FIGS. 2 and 4, a control shaft 60 is disposed in parallel to axles 50L and 50R and rotatably supported by a side wall of upper housing part 9t in opposite to drive train 30 with respect to HST 8. Control shaft 60 projects outwardly from housing 9 so as to be fixedly provided thereon with a control lever 61 operatively connected to an unshown human-operated traveling control member like a pedal or so on provided beside a seat on a vehicle.

As shown in FIG. 4, in housing 9, a swing arm 62 is fixed onto control shaft 60. Thus, control shaft 60, control lever 61 and swing arm 62 are unified so as to serve as a rotary member rotatably supported by housing 9. Swing arm 62 is extended substantially downwardly and notched at its lower end with a substantially vertical slit 62a. Swing arm 62 is fixedly provided with a push pin 67 in parallel to control shaft 60.

As shown in FIG. 4, center section 10 is bored therein with a longitudinal control valve chamber 83 beside oil circulation passages 71 and 72. Also, center section 10 is bored therein with a cylinder chamber 85 above control valve chamber 83 in parallel.

A hydraulic piston 84 is disposed in cylinder chamber 85 of center section 10 so as to be fluidly tightened and reciprocally slidable in the longitudinal direction therein, thereby constituting a hydraulic cylinder 80 as an actuator for movable swash plate 13. Thus, hydraulic piston 84 serves as a driving part of hydraulic cylinder 80, and center section 10 serves as a fixed portion of hydraulic cylinder 80. i.e., a cylinder casing thereof. Hydraulic piston 84 divides cylinder chamber 85 into front oil chamber C1 and rear oil chamber C2, which are brought into communication with control valve chamber 83 through respective outlet ports 81 and 82 vertically formed in center section 10.

A control valve 86 is disposed in control valve chamber 83 so as to be reciprocally slidable in the longitudinal direction therein. Control valve 86 consists of a pair of diametrically large portions 86a, a diametrically small portion 86b and an operational portion 86c. Diametrically large portions 86a are connected with each other through diametrically small portion 86b and formed so as to close both outlet ports 81 and 82 simultaneously. Operational portion 86c is extended from control valve chamber 83 to the outside of center section 10 toward swing arm 62.

Referring to FIGS. 4 and 5, an inlet port 87 is bored in center section 10 so as to bring discharge oil port 53 in charge pump casing 46 into communication with control valve chamber 83. Inlet port 87 is located so as to be constantly open to control valve chamber 83 between the pair of diametrically large portions 86a of control valve 86 regardless of the operational condition of control valve 86. In charge pump casing 46 is provided a resistance valve 88 in connection with oil passage 54 between discharge oil port 53 and inlet port 87. Also, in charge pump casing 46, a relief valve 96 for limiting the hydraulic pressure of hydraulic cylinder 80 is connected with oil passage 54 at the downstream of resistance valve 88.

Both opposite ends of control valve chamber 86 are open to the oil sump of first chamber R1 in housing 9 so that oil can be alternately drained from oil chambers C1 and C2 through respective outlet ports 81 and 82 to the oil sump.

A feedback portion 84a is fixed to one end of hydraulic piston 84 and projects from center section 10 toward swing arm 62. Hydraulic piston 84 is provided at the top surface of the longitudinally middle portion thereof with an upwardly open recess 84b. In center section 10 is bored an opening 10h upwardly through from recess 84b. Opening 10h is elongated in the longitudinal direction of hydraulic piston 84. The bottom of recess 84b is formed into a lower hemisphere. A ball joint 89 having a spherical external surface fitting with the bottom shape of recess 84b is inserted into recess 84b so as to slidably rotatably and fluid-tightly fit the bottom of recess 84b.

Beside hydraulic pump 11, a support shaft 55 which is parallel to axles 50L and 50R is supported by the side wall of housing 9. A connection rod 90 is substantially vertically disposed beside hydraulic pump 11 and pivoted at its vertically intermediate portion onto support shaft 55. Connection rod 90 is provided at its one end portion with a projection 90a projecting toward hydraulic pump 11 so as to be engaged between a pair of projections 13a provided on a side portion of movable swash plate 13. The other end portion of connection rod 90, which is gradually narrowed, is slidably inserted into an axial-through hole bored in ball joint 89 through opening 10h of center section 10 and recess 84b of hydraulic piston 84. The reciprocal movement of hydraulic piston 84 is altered to the rotational movement of movable swash plate 13 through ball joint 89 and connection rod 90.

A link rod 100 is substantially vertically interposed between swing arm 62 as a part of the above-mentioned rotary member and control valve 86, thereby altering the rotational movement of swing arm 62 to the reciprocal movement of control valve 86. That is, a push pin 101 is provided on one end portion (an upper end portion) of link rod 100 so as to be slidably inserted into slit 62a formed in swing arm 62, and the other end portion (a lower end portion) of link rod 100 is pivotally connected to an external end of operational portion 86c of control valve 83. disposed so as to be pivoted at its one end portion (a lower end portion thereof) onto the utmost end of operational portion 86c of control valve 86. An intermediate portion of link rod 100 is pivotally connected to feedback portion 84a of hydraulic piston 84. Link rod 100 and the above-mentioned rotary member including swing arm 63 constitute a link mechanism for operating control valve 86.

As shown in FIG. 4, when control lever 61 is located at its neutral position, both outlet ports 81 and 82 are shut from control valve chamber 83 by control valve 86, thereby holding hydraulic piston 84 in cylinder chamber 85 in correspondence to the neutral position of movable swash plate 13.

From this neutral condition, control lever 61 is rotated counterclockwise centering around control shaft 60. Control shaft 60 and swing arm 62 are rotated together with control lever 61. Then, swing arm 62 reaches the position as shown in FIG. 6, wherein push pin 101 on the upper end portion of link rod 100 is pushed by swing arm 62 while push pin 101 being abutting against one end (in FIG. 6, the left end) of slit 62a. Hydraulic cylinder 80 is held in neutral because outlet ports 81 and 82 still remains closed. That is, hydraulic piston 84 and feedback portion 84a are held in their initial positions shown in FIG. 4. Accordingly, link rod 100 is rotated clockwise in a way such as a seesaw while its joint point with feedback portion 84a serving as a fulcrum, so that the lower end portion of link rod 100 pushes operational portion 86c, thereby moving control valve 86 oppositely to the upper end portion of link rod 100 pushed by swing arm 62 (in FIG. 6, leftwardly).

By pushing control valve 86 in such a manner with human force, inlet port 87 is brought into communication with one outlet port 82 so as to feed oil discharged from charge pump 45 into oil chamber C1 of cylinder chamber 85. Simultaneously, the other outlet port 81 in communication with oil chamber C2 of cylinder chamber 85 is brought into fluidal communication with control valve chamber 83, thereby draining oil in oil chamber C2 to the oil sump in first chamber R1.

Consequently, as shown in FIG. 7, hydraulic piston 84 is pressured to move rightward (to the moving direction of the lower end of link rod 100) so that movable swash plate 13 in connection with hydraulic piston 84 through connection rod 90 is rotated counterclockwise centering around support shaft 55.

In consideration of FIG. 7, feedback portion 84a of hydraulic piston 84 also moves rightward so that link rod 100, which is pivotally connected at its intermediate portion with feedback portion 84a, is rotated counterclockwise centering around push pin 101 in slit 62a so as to pull operational portion 86a of control valve 86 rightward. Accordingly, control valve 86 is moved so as to close both outlet ports 81 and 82 again. Finally, hydraulic piston 84 is moved to a degree corresponding to the rotational degree of control lever 61, and then, control valve 86 completely closes both outlet ports 81 and 82, thereby stopping hydraulic piston 84. Hence, movable swash plate 13 is tilted at an angle corresponding to the shift of hydraulic piston 84 so as to vary the volumetric capacity of hydraulic pump 11.

As mentioned above, by rotating control lever 61 in the longitudinal direction of the vehicle so as to rotate swing arm 62 forwardly or rearwardly around control shaft 60, link rod 100 is operated so that control valve 86 is reciprocally moved so as to supply oil into one of outlet ports 81 and 82 and drain oil from the other, thereby actuating hydraulic cylinder 80 for rotating movable swash plate 13.

Due to such structured hydraulic servomechanism with hydraulic cylinder 80, a human force to be applied onto control lever 61 (i.e., the human-operated speed change operation member like a speed change pedal) can be reduced to that just required to shift control valve 86. Therefore, even in traveling for a long time, a vehicle having IHT 1 of this embodiment can be tirelessly driven.

As shown in FIGS. 2, 4, 6 and 7, for biasing control lever 61 to its neutral position, an eccentric shaft 66 is fixedly supported by the side wall of upper housing part 9t so as to extend in parallel to push pin 67 on swing arm 62 in housing 9. A neutral-returning spring 65 is coiled around control shaft 60 in housing 9. Both end portions of neutral-returning spring 65 cross each other and extend so as to sandwich push pin 67 and eccentric shaft 66, as shown in FIG. 4 when control lever 61 is located in neutral.

When control lever 61 is rotated for changing the traveling speed of the vehicle, push pin 67 pushes one of both end portions of neutral-returning spring 65 away from the other which is held by eccentric shaft 66, as shown in FIGS. 6 and 7. Thus, there is generated a spring force in neutral-returning spring 65 with the space between both the end portions thereof widened so as to bias control lever 61 to its neutral position which is demarcated by fixed eccentric shaft 66. Then, when control lever 61 is released from a human operation force, push pin 67 is pushed by the one end portion of neutral-returning spring 65 with its spring force and brought into contact with the other end portion of neutral-returning spring 65. Thus, control lever 61 is returned together with push pin 67, swing arm 62 and control shaft 60 to its neutral position and held there by neutral-returning spring 65, as shown in FIG. 4, so that movable swash plate 13 is returned to and held at its neutral position.

Incidentally, eccentric shaft 66 projects outwardly from housing 9 so as to be formed into a threaded rod, around which a nut 66a is provided for fastening eccentric shaft 66 together with upper housing part 9t. By rotating eccentric shaft 66 and optimally locating nut 66a, the neutral positions of swing arm 62, link rod 100 and control valve 86 are adjusted, thereby adjusting movable swash plate 13 to a proper neutral position.

It is further understood by those skilled in the art that the foregoing description is a preferred embodiment of the disclosed device and that various changes and modifications may be made in the invention without departing from the spirit and scope thereof.

What is claimed is:

1. An axle driving apparatus comprising:

a common housing;

a hydraulic pump receiving power from a prime mover, said hydraulic pump being contained in said housing;

a hydraulic motor fluidly connected with said hydraulic pump, said hydraulic motor being contained in said housing, wherein at least one of said hydraulic pump and said hydraulic motor is variable in displacement;

a capacity changing device for changing the capacity of said at least one of said hydraulic pump and said hydraulic motor;

an axle driven by said hydraulic motor, said axle being contained in said housing;

a hydraulic actuator contained in said housing for operating said capacity changing device, said hydraulic actuator having a driving part and a fixed part, said fixed part being fixed to said housing, said driving part being operatively connected to said capacity changing device;

a control valve contained in said housing for hydraulically controlling said hydraulic actuator and being operatively connected to a traveling control member provided on a vehicle; and a center section formed therein with a closed fluid circuit through which said hydraulic pump and said hydraulic motor are fluidly connected with each other, wherein said control valve is disposed in said center section.

2. The axle driving apparatus as set forth in claim 1, wherein said driving part of said hydraulic actuator is connected to a link mechanism for feedback thereof.

3. The axle driving apparatus as set forth in claim 1, further comprising:

a neutral returning means provided on a link mechanism, wherein said link mechanism is biased to its neutral position by said neutral returning means for returning said capacity changing device.

4. The axle driving apparatus as set forth in claim 1, said capacity changing device being a rotationally movable swash plate, further comprising:

a connection member interposed between said movable swash plate and said driving part of said hydraulic actuator, wherein said connection member alters a reciprocal movement of said driving part of said hydraulic actuator into the rotational movement of said movable swash plate.

5. An axle driving apparatus comprising:

a common housing;

a hydraulic pump receiving power from a prime mover, said hydraulic pump being contained in said housing;

a hydraulic motor fluidly connected with said hydraulic pump, said hydraulic motor being contained in said housing, wherein at least one of said hydraulic pump and said hydraulic motor is variable in displacement;

a capacity changing device for changing the capacity of said at least one of said hydraulic pump and said hydraulic motor;

an axle driven by said hydraulic motor, said axle being contained in said housing;

a hydraulic actuator for operating said capacity changing device, said hydraulic actuator having a driving part and a fixed part, said fixed part being fixed to said housing, said driving part being operatively connected to said capacity changing device;

a control valve for hydraulically controlling said hydraulic actuator, wherein said hydraulic actuator is supplied through said control valve with oil filled in said housing and being operatively connected to a traveling control member provided on a vehicle; and a center section formed therein with a closed fluid circuit through which said hydraulic pump and said hydraulic motor are fluidly connected with each other, wherein said control valve is disposed in said center section.

6. An axle driving apparatus comprising:

a common housing;

a hydraulic pump receiving power from a prime mover, said hydraulic pump being contained in said housing;

a hydraulic motor fluidly connected with said hydraulic pump, said hydraulic motor being contained in said housing, wherein at least one of said hydraulic pump and hydraulic motor is variable in displacement;

a capacity changing device for changing the capacity of said at least one of said hydraulic pump and said hydraulic motor;

an axle driven by said hydraulic motor, said axle being contained in said housing;

a hydraulic actuator for operating said capacity changing device, said hydraulic actuator having a driving part and a fixed part, said fixed part being fixed to said housing, said driving part being operatively connected to said capacity changing device;

a control valve for hydraulically controlling said hydraulic actuator, wherein said hydraulic actuator is supplied through said control valve with oil filled in said housing and being operatively connected to a traveling control member provided on a vehicle; and a center section formed therein with a closed fluid circuit through which said hydraulic pump and said hydraulic motor are fluidly connected with each other, wherein said control valve is disposed in said center section.

7. An axle driving apparatus comprising:

a common housing;

a hydraulic pump receiving power from a prime mover, said hydraulic pump being contained in said housing;

a hydraulic motor fluidly connected with said hydraulic pump, said hydraulic motor being contained in said housing, wherein at least one of said hydraulic pump and said hydraulic motor is variable in displacement;

a capacity changing device for changing the capacity of said at least one of said hydraulic pump and said hydraulic motor;

an axle driven by said hydraulic motor, said axle being contained in said housing;

a hydraulic actuator contained in said housing for operating said capacity changing device, said hydraulic actuator having a driving part and a fixed part, said fixed part being fixed to said housing, said driving part being operatively connected to said capacity changing device;

a control valve contained in said housing for hydraulically controlling said hydraulic actuator;

a link mechanism for operating said control valve, said link mechanism being operatively connected to a traveling control member provided on a vehicle, wherein said link mechanism is contained in said housing while a part of said link mechanism is extended outward from said housing so as to be operatively connected to said traveling control member; and a center section disposed within said housing, said center section being formed therein with a closed fluid circuit through which said hydraulic pump and said hydraulic motor are fluidly connected with each other, wherein said control valve is disposed in said center section.

8. An axle driving apparatus comprising:

a common housing;

a hydraulic pump receiving power from a prime mover, said hydraulic pump being contained in said housing;

a hydraulic motor fluidly connected with said hydraulic pump, said hydraulic motor being contained in said housing, wherein at least one of said hydraulic pump and said hydraulic motor is variable in displacement;

a capacity changing device for changing the capacity of said at least one of said hydraulic pump and said hydraulic motor;

an axle driven by said hydraulic motor, said axle being contained in said housing;

a hydraulic actuator for operating said capacity changing device, said hydraulic actuator having a driving part and a fixed part, said fixed part being fixed to said housing, said driving part being operatively connected to said capacity changing device;

a reciprocally movable control valve for hydraulically controlling said hydraulic actuator and being operatively connected to a traveling control member provided on a vehicle; and a center section formed therein with a closed fluid circuit through which said hydraulic pump and said hydraulic motor are fluidly connected with each other, wherein said control valve is disposed in a chamber provided in a bore in said center section.

9. The axle driving apparatus as set forth in claim 8, wherein said control valve is reciprocally movable in parallel to said driving part of said hydraulic actuator.

10. The axle driving apparatus as set forth in claim 8, said link mechanism comprising:

a rotary member rotatably supported by said housing, said rotary member being operatively connected to said traveling control member;

a link member interposed between said rotary member and said control valve, wherein said link member alters the rotational movement of said rotary member into the reciprocal movement of said control valve.

11. The axle driving apparatus as set forth in claim 10, wherein said driving part of said hydraulic actuator is connected to said link member for feed back thereof.

12. The axle driving apparatus as set forth in claim 11, wherein a portion of said link member between its connection portions with said rotary member and said control valve is provided for connection with said driving part of said hydraulic actuator.

13. The axle driving apparatus as set forth in claim 10, wherein said hydraulic actuator, said control valve, said rotary member and said link member are contained in said housing, and wherein said rotary member partly projects outwardly from said housing so as to be operatively connected to said traveling control member.

14. The axle driving apparatus as set forth in claim 10, further comprising:

a neutral returning means provided on said rotary member, wherein said rotary member is biased to its neutral position by said neutral returning means for returning said capacity changing device.

15. An axle driving apparatus comprising:

a common housing;

a hydraulic pump receiving power from a prime mover, said hydraulic pump being contained in said housing;

a hydraulic motor fluidly connected with said hydraulic pump, said hydraulic motor being contained in said housing, wherein at least one of said hydraulic pump and said hydraulic motor is variable in displacement;

a capacity changing device for changing the capacity of said at least one of said hydraulic pump and said hydraulic motor;

an axle driven by said hydraulic motor, said axle being contained in said housing;

a hydraulic actuator for operating said capacity changing device, said hydraulic actuator having a driving part and a fixed part, said fixed part being fixed to said housing, said driving part being operatively connected to said capacity changing device;

a control valve for hydraulically controlling said hydraulic actuator;

a link mechanism supported by said housing for operating said control valve, said link mechanism being operatively connected to a traveling control member provided on a vehicle; and a center section formed therein with a closed fluid circuit through which said hydraulic pump and said hydraulic motor are fluidly connected with each other, wherein said control valve is disposed in said center section.

16. The axle driving apparatus as set forth in claim 15, wherein said center section is contained in said housing.

17. The axle driving apparatus as set forth in claim 15, wherein said control valve is incorporated in said center section.

18. The axle driving apparatus as set forth in claim 17, wherein said control valve is reciprocally movable in parallel to said driving part of said hydraulic actuator.

19. The axle driving apparatus as set forth in claim 17, wherein said center section is contained in said housing.

20. An axle driving apparatus comprising:

a common housing;

a hydraulic pump receiving power from a prime mover, said hydraulic pump being contained in said housing;

a hydraulic motor fluidly connected with said hydraulic pump, said hydraulic motor being contained in said housing, wherein at least one of said hydraulic pump and said hydraulic motor is variable in displacement;

a capacity changing device for changing the capacity of said at least one of said hydraulic pump and said hydraulic motor;

an axle driven by said hydraulic motor, said axle being contained in said housing;

a hydraulic actuator for operating said capacity changing device, said hydraulic actuator having a driving part and a fixed part, said fixed part being fixed to said housing, said driving part being operatively connected to said capacity changing device;

a control valve for hydraulically controlling said hydraulic actuator;

a link mechanism for operating said control valve, said link mechanism being operatively connected to a traveling control member provided on a vehicle; and a center section formed therein with a closed fluid circuit through which said hydraulic pump and said hydraulic motor are fluidly connected with each other, wherein said control valve is disposed in a chamber provided in a bore in said center section.

21. The axle driving apparatus as set forth in claim 20, wherein said center section is contained in said housing.

* * * * *